(12) United States Patent
Voyatzakis et al.

(10) Patent No.: US 12,082,588 B1
(45) Date of Patent: Sep. 10, 2024

(54) HEATED PLATEN EXPANSION COMPENSATOR FOR A DOUGH PRESS

(71) Applicant: Somerset Industries, Inc., Lowell, MA (US)

(72) Inventors: Andrew D Voyatzakis, Carlisle, MA (US); George Athanasiadis, Lexington, MA (US)

(73) Assignee: Somerset Industries, Inc., Lowell, MA (US)

( * ) Notice: Subject to any disclaimer, the term of this patent is extended or adjusted under 35 U.S.C. 154(b) by 0 days.

(21) Appl. No.: 18/603,394

(22) Filed: Mar. 13, 2024

Related U.S. Application Data

(60) Provisional application No. 63/489,947, filed on Mar. 13, 2023.

(51) Int. Cl.
*A21C 11/00* (2006.01)
*B29C 43/52* (2006.01)

(52) U.S. Cl.
CPC ........... *A21C 11/006* (2013.01); *A21C 11/004* (2013.01); *B29C 43/52* (2013.01)

(58) Field of Classification Search
CPC ........ A21C 11/00; A21C 11/006; A21C 15/02
See application file for complete search history.

(56) References Cited

U.S. PATENT DOCUMENTS

| | | | | |
|---|---|---|---|---|
| 3,814,005 A | * | 6/1974 | Widdel | A47J 37/0611 99/380 |
| 5,417,149 A | * | 5/1995 | Raio | A21B 5/00 100/319 |
| 6,332,768 B1 | * | 12/2001 | Raio | B30B 15/285 425/408 |

* cited by examiner

*Primary Examiner* — Thu Khanh T. Nguyen
(74) *Attorney, Agent, or Firm* — Altman & Martin; Steven K. Martin

(57) ABSTRACT

A coupler that mounts a platen to a dough press to compensate for expansion of the heated platen to prevent warping. The coupler has a center plate securely sandwiched between an inner plate and an outer plate. The center plate has three equidistantly spaced voids. An expansion compensation lattice has at least one narrow bar extending laterally between the void sides within the void and a center plate expansion hole in a disc at the lateral center of the bar. The inner and outer plates are solid. The plates are secured together by bolts at the center and perimeter of the plates. Expansion bolts extend through the center plate expansion hole, an outer plate expansion hole, a spacer, the heat pad, and into a threaded hole in the platen. The heated platen pulls the expansion bolts outwardly, causing the lattice to bend outwardly, thereby preventing the platen from warping.

9 Claims, 11 Drawing Sheets

HEATED PLATEN EXPANSION COMPENSATOR FOR A DOUGH PRESS

STATEMENT REGARDING FEDERALLY SPONSORED RESEARCH OR DEVELOPMENT

Not Applicable

REFERENCE TO A SEQUENCE LISTING, A TABLE, OR A COMPUTER PROGRAM LISTING COMPACT DISK APPENDIX

Not Applicable

BACKGROUND OF THE INVENTION

1. Field of the Invention

The present invention relates to dough presses, more particularly, to dough presses with a platen heater and a mechanism to prevent the platen from warping when heated.

2. Description of the Related Art

The typical dough press has a base supporting a lower platen with a lower working surface and an upper housing supporting an upper platen with an upper working surface. The lower platen is fixed vertically and the upper platen is securely attached to the shaft of the reciprocating mechanism that moves the upper platen up and down relative to the lower platen between an open position, where the upper platen is spaced from the lower platen, and a closed position, where dough placed on the lower working surface is compressed between the upper working surface and the lower working surface.

Some dough presses have electrically heated platens to relax the dough so it spreads more evenly. As is well-known, different materials expand at different rates when heated. Because the lower platen and the base that it is attached to are composed of different materials and the upper platen and the shaft of the reciprocating mechanism that it is attached to are composed of different materials, the platens warp when heated. When the platen warps, the working surface warps, causing the dough sheet to have a nonuniform thickness.

BRIEF SUMMARY OF THE INVENTION

The present invention is a mechanism for compensating for expansion of a heated platen of a dough press to prevent warping of the platen. The present invention is for use with a dough press with lower and upper platen, one or both of which are heated. The lower platen is typically mounted to a tray on the base and the upper platen is attached to the shaft of a reciprocating mechanism.

The present invention is an expansion compensating coupler that mounts a platen to the dough press, the lower platen to the tray and/or the upper platen to the reciprocating mechanism shaft. The coupler permits a heated platen to expand when heated so that the working surface of the platen does not warp.

The coupler has a center plate sandwiched between an inner plate and an outer plate. In one design, the plates have a generally trefoil shape with a central hub and three equidistantly spaced lobes. However, the plates can be any appropriate shape, such as round or hexagonal, or have a different number of lobes.

The center plate has at least three voids spaced equidistantly around the center plate. If the center plate has lobes, each lobe has a void. Each void has a proximal end adjacent to the hub, a distal end, and two opposed sides. Within the void is an expansion compensation lattice that has at least one narrow bar extending laterally within the void between the void sides. A disc attached at the lateral center of the lattice has a center plate expansion hole. With two bars, the disc is positioned between the bars and with one bar, the disc is positioned at the center of the bar.

The inner plate and outer plate are generally solid other than a number of bolt holes and expansion holes.

The plates are secured together. In the present configuration, the plates are secured together by center securing bolts extending through aligned center securing holes around the center of the hub and by perimeter securing bolts extending through aligned perimeter securing holes around the perimeter of the plates.

When mounting the coupler to the lower platen tray, three tray securing bolts extend through aligned tray mounting holes on the perimeter and aligned holes in the tray. When mounting the coupler to the reciprocating mechanism shaft, the three center securing bolts also extend through holes in the shaft.

The platen is mounted to the coupler by expansion bolts. Each expansion bolt extends through the center plate expansion hole, through an outer plate expansion hole in the outer plate, through a spacer, through a hole in the heat pad, and turned into a threaded hole in the platen. The expansion bolt head resides in an inner plate expansion hole in the inner plate.

When the platen is heated, it expands outwardly from the center relative to the coupler. As it expands, it pulls the expansion bolts radially with it. As they move and because the center plate expansion holes are the same size as the expansion bolt shaft, the expansion bolts pull outwardly on the center plate expansion holes, causing the lattice bar(s) to bend radially outwardly. The outer plate expansion holes are larger than the expansion bolt shafts so the expansion bolt shafts have space to move radially outwardly. The inner plate expansion holes are larger than the expansion bolt heads so the expansion bolt heads have space to move radially outwardly.

The inner plate and outer plate securely sandwich the center plate so that the lattice can only bend radially and not twist or pivot which, if allowed, would cause the heated platen to warp.

Objects of the present invention will become apparent in light of the following drawings and detailed description of the invention.

BRIEF DESCRIPTION OF THE DRAWINGS

For a fuller understanding of the nature and object of the present invention, reference is made to the accompanying drawings, wherein.

DETAILED DESCRIPTION OF THE INVENTION

The present application hereby incorporates by reference in its entirety U.S. Provisional Patent Application No. 63/489,947, on which this application is based.

Figure 5:
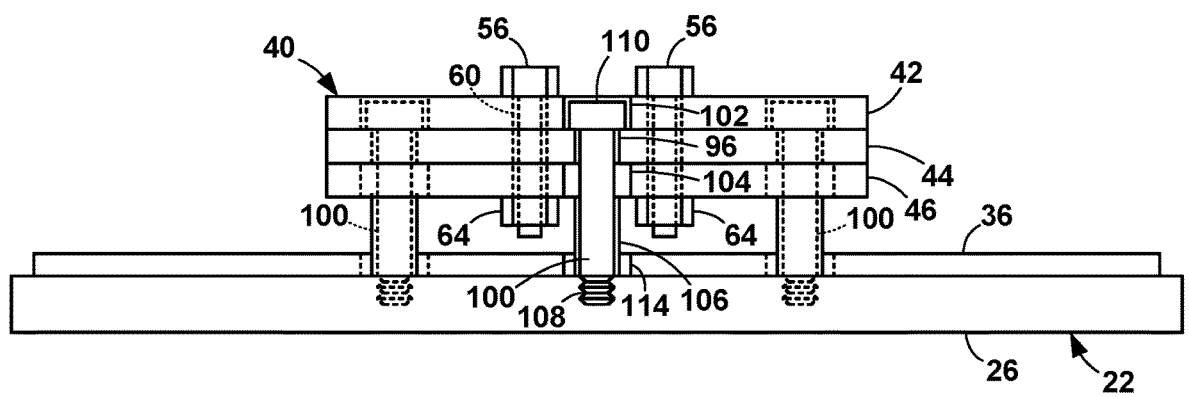
FIG. 5 is a cross-section of the coupler with a platen attached.

The present invention is a mechanism for compensating for expansion of a heated platen of a dough press to prevent warping of the platen. The present invention is for use with a dough press 10 that has a frame 12 with a base 14 and housing 16. The base 14 supports a lower platen 20 with a lower working surface 24, while the housing 16 supports an upper platen 22 with an upper working surface 26 opposed to the lower working surface 24. One or both of the platens 20, 22 are heated. Typically, the platen 20, 22 is heated by an electrically powered heating pad 36 abutting the platen 20, 22 opposite the working surface 24, 26, as in FIGS. 2, 3, and 5. However, any method of heating the platen 20, 22 can be employed. Other examples include heating wires embedded in the platen 20, 22 and hot liquid capillaries embedded in the platen 20, 22.

The lower platen 20 is typically, but not necessarily, mounted to the base 14 by a tray 70 that fixes the lower platen 20 vertically and that can be pivoted horizontally from under the upper platen 22 to provide access to the lower working surface 24. The tray 70 with the lower platen 20 is generally easy to remove from the dough press 10.

Figure 1:
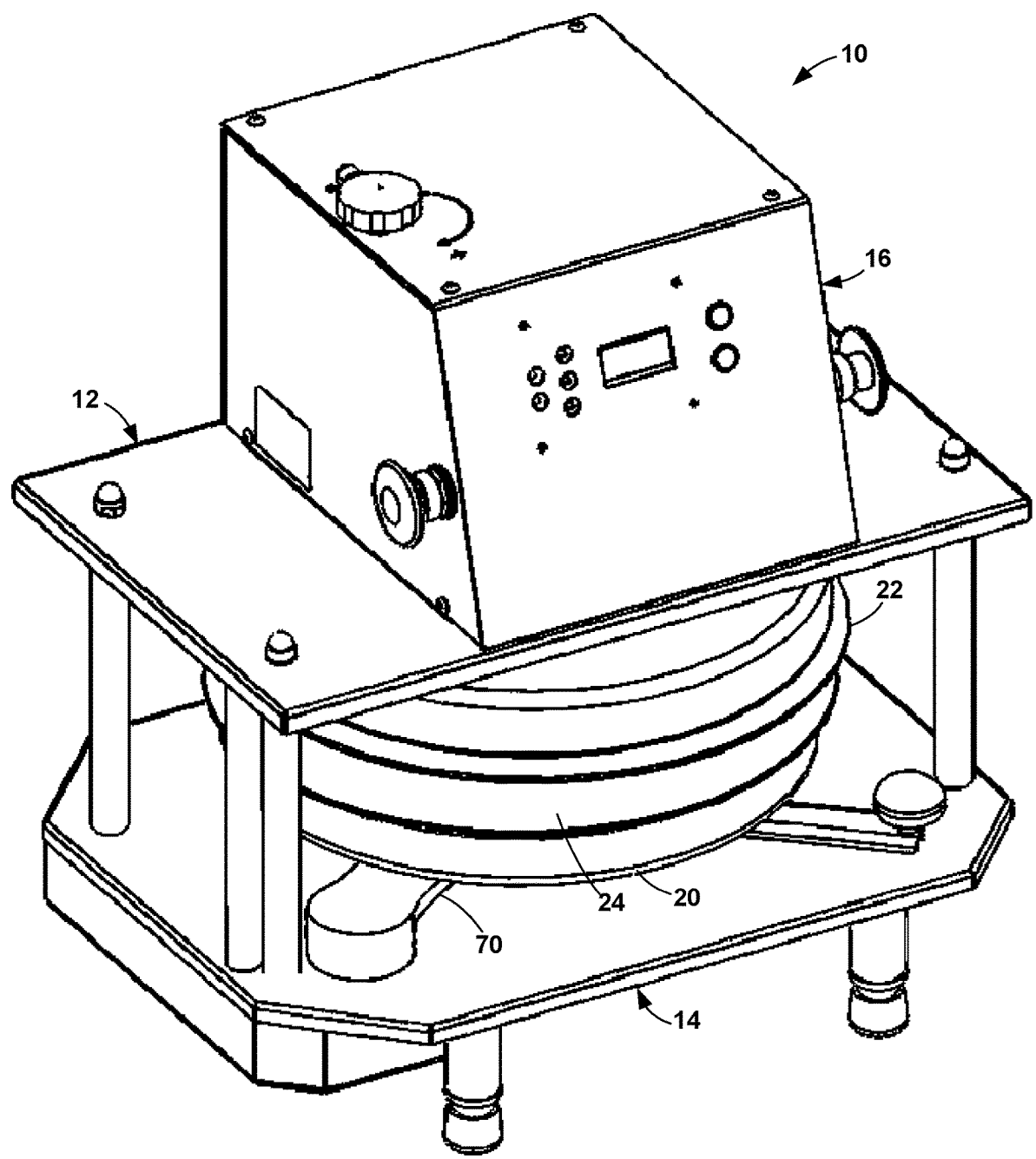
FIG. 1 is a perspective view of a dough press.

The upper platen 22 is securely attached to the shaft 30 of a reciprocating mechanism 18 in the housing 16. The reciprocating mechanism 18 moves the upper platen 22 up and down relative to the lower platen 20 between an open position and a closed position, while maintaining the working surfaces 24, 26 aligned. The reciprocating mechanism 18 can be operated either manually by a handle or automatically, such as by hydraulic piston or electric motor, as in the design of FIG. 1. The prior art teaches many different reciprocating mechanisms and the present invention contemplates that any reciprocating mechanism 18 can be employed.

In the open position, the upper working surface 26 is significantly spaced from the lower working surface 24 so that the lower working surface 24 is accessible to place and remove dough. In the closed position, dough placed on the lower working surface 24 is compressed between the upper working surface 26 and lower working surface 24 to form a dough sheet such as a pizza crust.

Typically, the working surfaces 24, 26 are flat so that the dough press produces a dough sheet of uniform thickness. The working surfaces 24, 26 may have features for shaping the dough, such as, for example, an annular groove to form a raised rim on a pizza crust.

As discussed above, heating a platen of one material attached to a different material can cause warping of the working surface, thereby causing the flattened dough to have a nonuniform thickness.

The present invention is an expansion compensating coupler 40 that mounts a platen 20, 22 to the dough press 10 where appropriate. The coupler 40 can mount the lower platen 20 to the tray 70 or it can mount the upper platen 22 to the shaft 30. The coupler 40 permits a heated platen 20, 22 to expand when heated so that the working surface 24, 26 does not warp. The result is a dough sheet of uniform thickness.

As shown in FIGS. 2-5, the coupler 40 is comprised of a center plate 44 sandwiched between an inner plate 42 and an outer plate 46. In one design, shown in FIGS. 6, 8, and 9, the plates 42, 44, 46 have a generally trefoil shape with a central hub 50 and three lobes 52 extending from the hub 50 and equidistantly spaced around the hub 50 (120° center to center). However, the present invention contemplates that the plates 42, 44, 46 can be any appropriate shape, such as round, as in FIGS. 7 and 10, or hexagonal, or have a different number of lobes 52 that are spaced equidistantly around the hub 50. The trefoil shape has less material than, for example, the round shape and is, therefore, lighter. Further, the plates 42, 44, 46 do not all have to be the same shape.

The center plate 44 has at least three voids 86 spaced equidistantly around the center plate 44. If the center plate 44 has lobes 52, each lobe 52 has a void 86, as in FIGS. 6 and 8. Each void 86 has a proximal end 80 adjacent to the hub 50, a distal end 84 opposite the proximal end 80, and two opposed sides 82. The void 86 is a generally, though not necessarily, rectangular.

Figure 6:
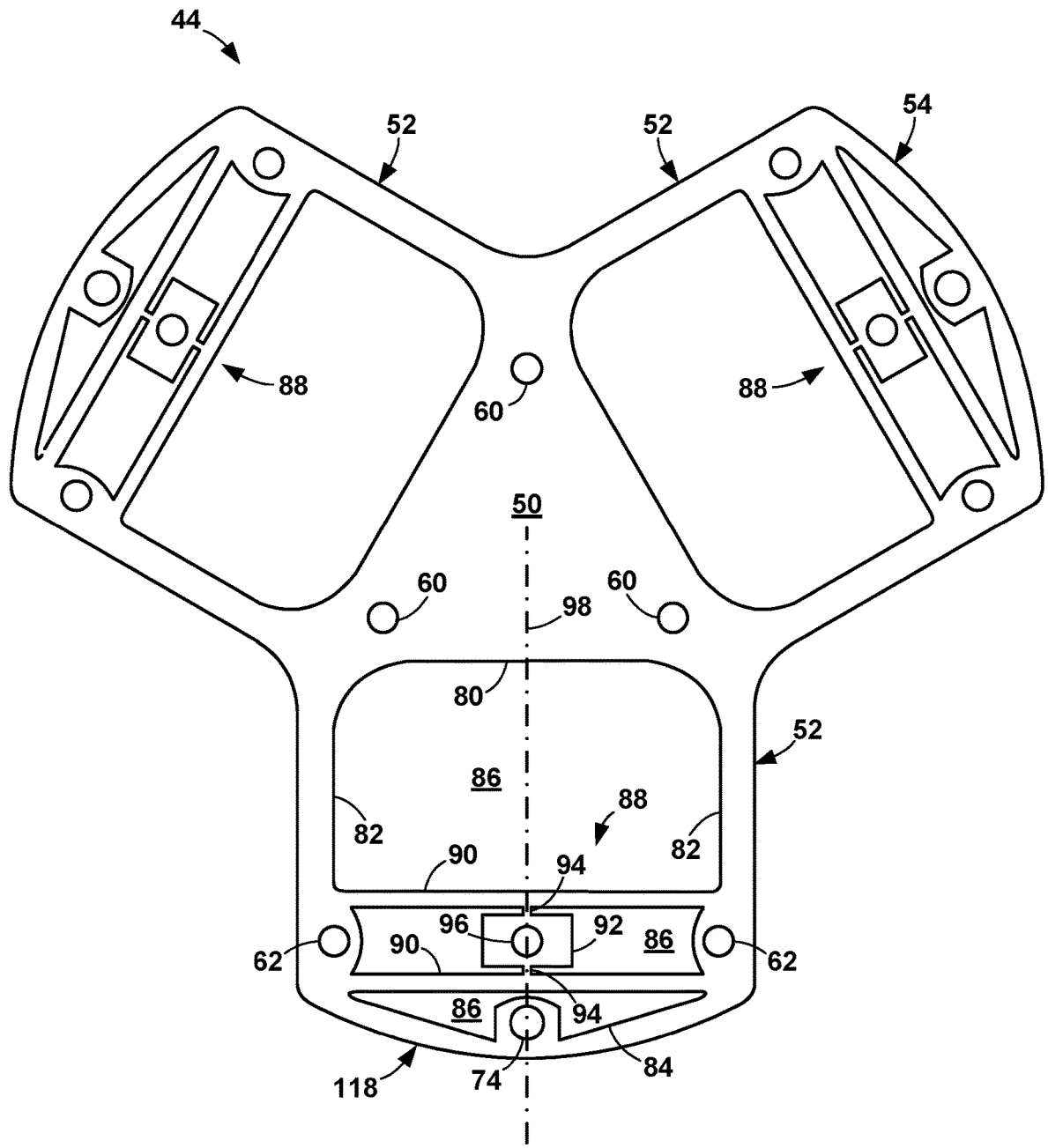
FIG. 6 is a plan view of a first lobed configuration of the center plate.
Figure 7:
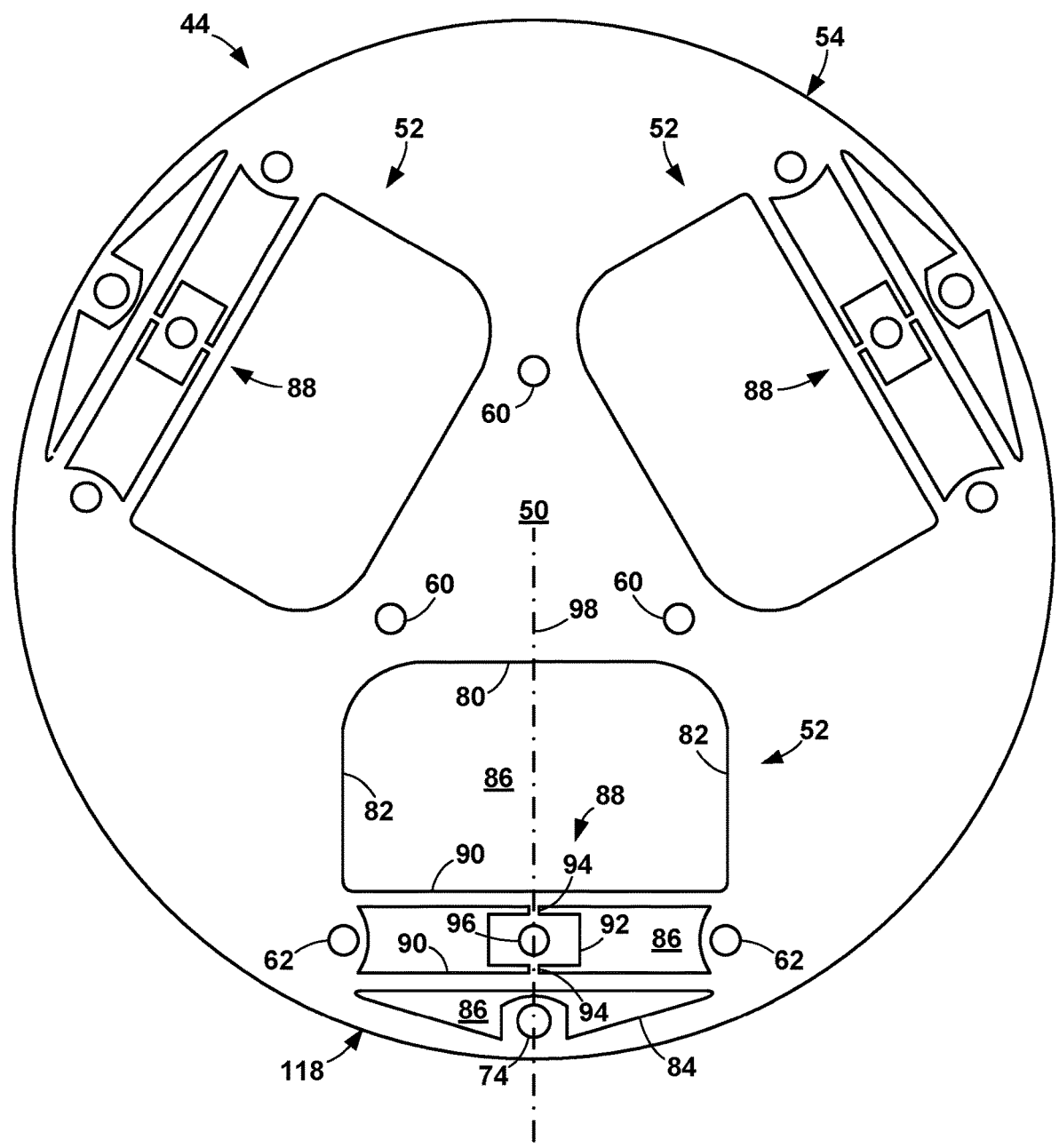
FIG. 7 is a plan view of a first round configuration of the center plate.

Within the void 86 is an expansion compensation lattice 88. In the configuration of FIGS. 6 and 7, the expansion compensation lattice 88 has two narrow, parallel bars 90 extending laterally (perpendicularly to the center plate radius 98 that extends through the center of the void 86) within the void 86 between the void sides 82. A disc 92 at the lateral center of the lattice 88 is positioned between the bars 90 and is attached to each bar 90 by a narrow neck 94. The disc 92 is shown as rectangular, but can be any shape such as square, round, or oval. Extending through the disc 92 is a center plate expansion hole 96.

Figure 8:
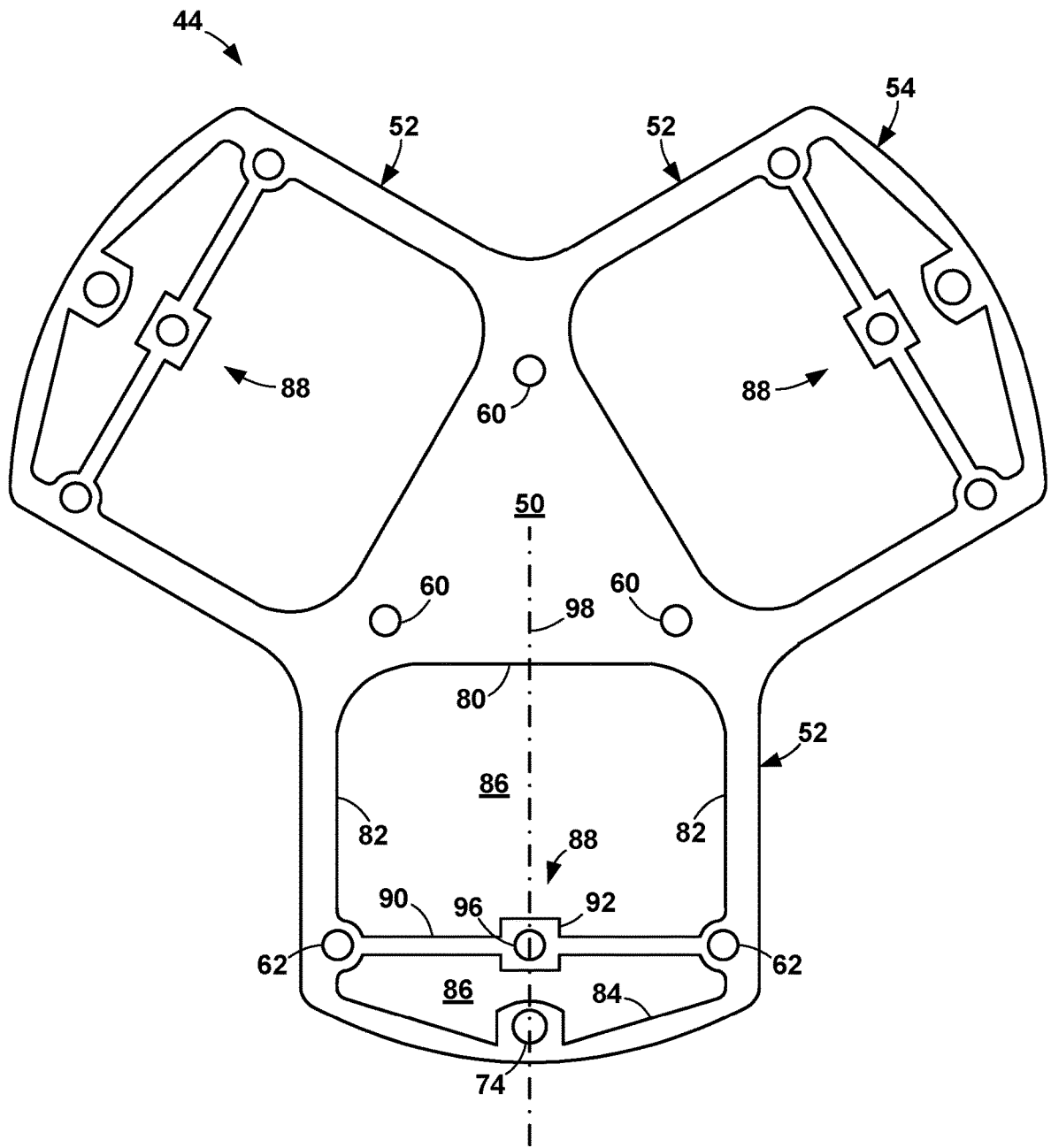
FIG. 8 is a plan view of a second lobed configuration of the center plate.

In the configuration of FIG. 8, the expansion compensation lattice 88 has a narrow bar 90 extending laterally (perpendicularly to the center plate radius 98 that extends through the center of the void 86) between the void sides 82. A disc 92 is located at the lateral center of the bar 90, placing it at the lateral center of the lattice 88. The disc 92 is shown as rectangular, but can be any shape such as square, round, or oval. Extending through the disc 92 is a center plate expansion hole 96.

The center plate 44 has a number of optional bolt holes 60, 62, 74 described below.

Figure 9:
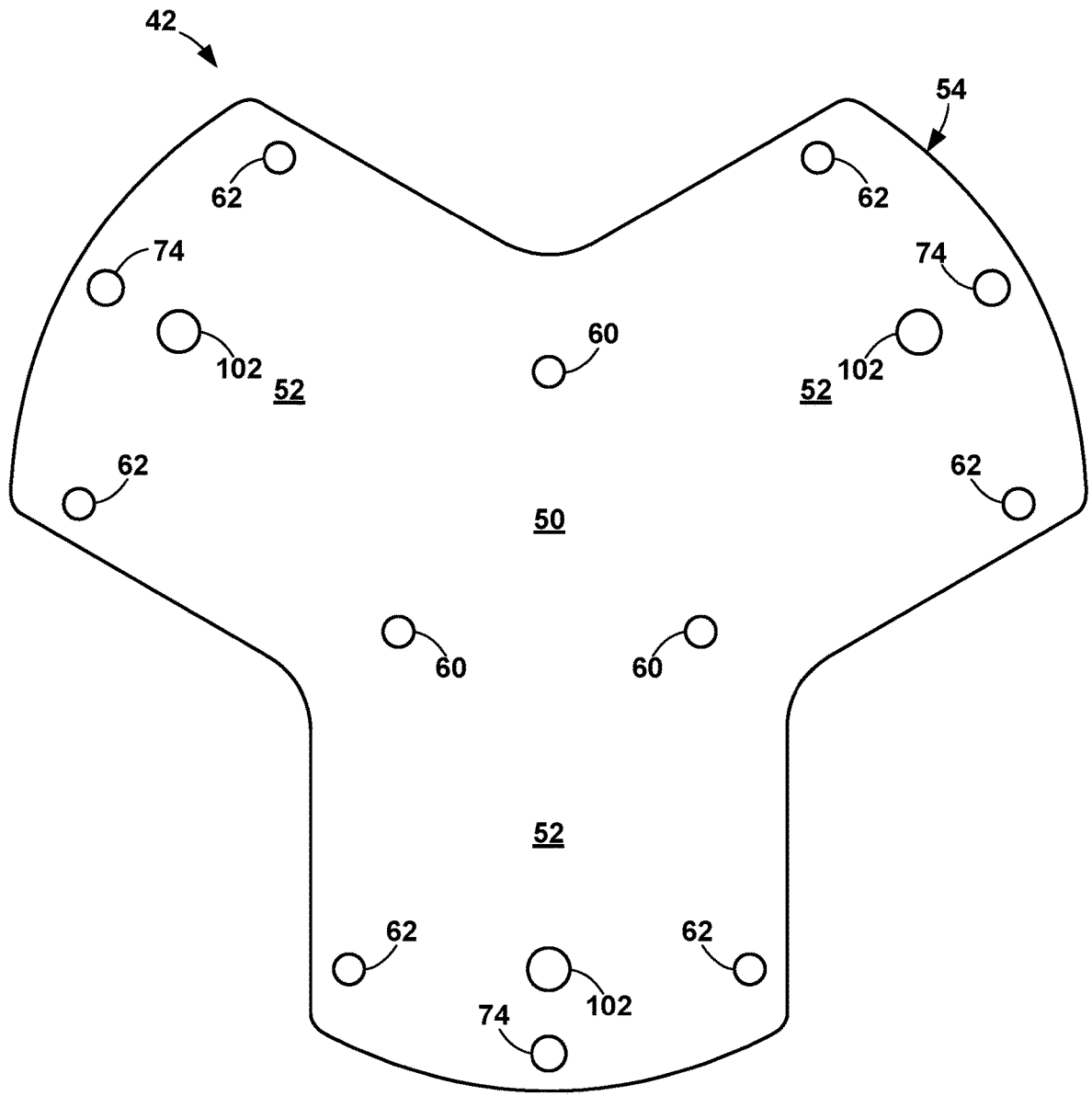
FIG. 9 is a plan view of a lobed configuration of the inner and outer plates.
Figure 10:
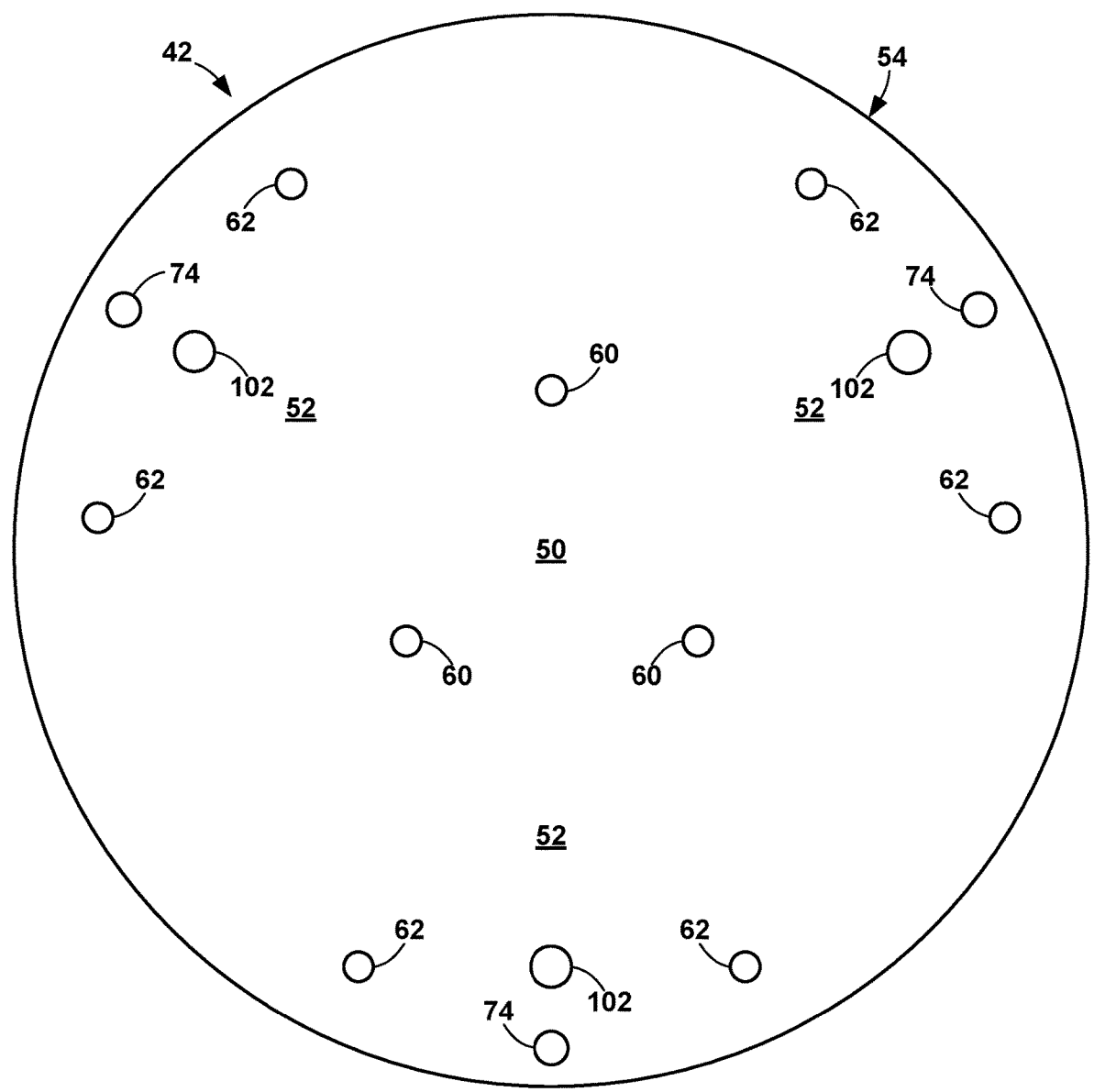
FIG. 10 is a plan view of a round configuration of the inner and outer plates.

The inner plate 42 and outer plate 46 are preferably, though not necessarily, identical. As shown in the configurations of FIGS. 9 and 10, they are generally solid; that is, they have no voids and only a number of bolt holes 60, 62, 74 and expansion holes 102, 104 described below.

Figure 2:
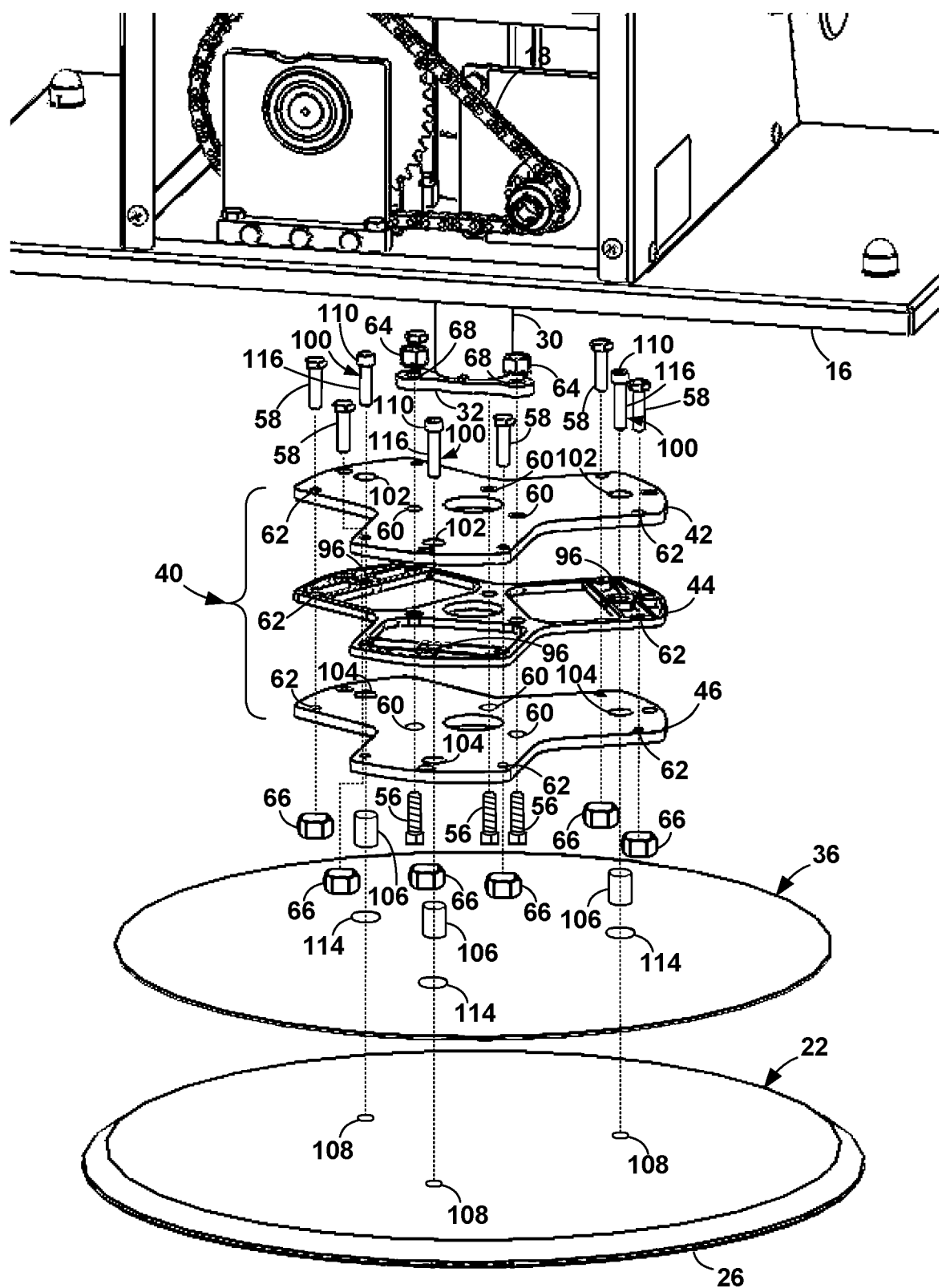
FIG. 2 is an exploded perspective view of part of the upper housing, coupler, and upper platen.
Figure 3:
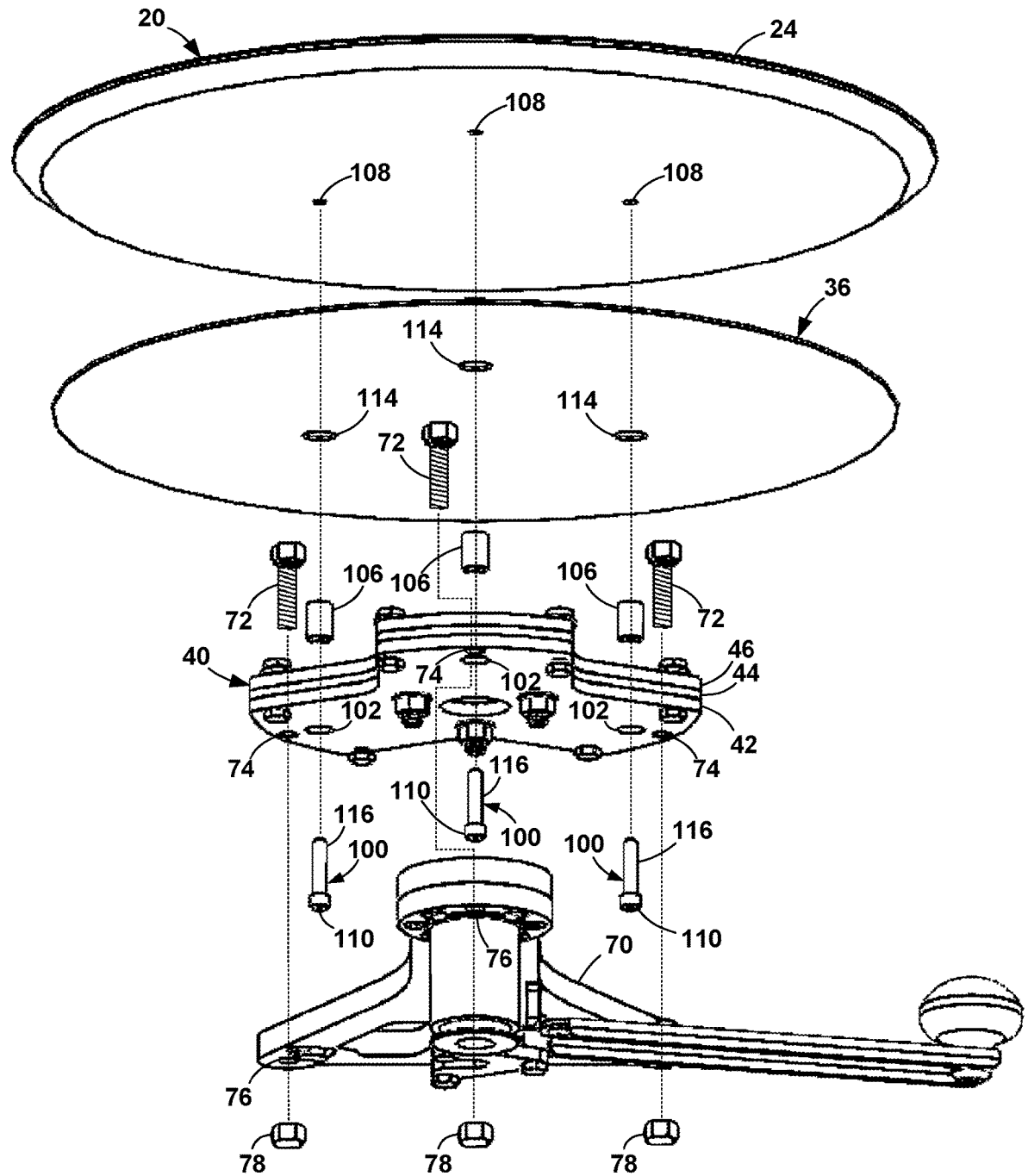
FIG. 3 is an exploded perspective view of the tray, coupler, and lower platen.
Figure 4:
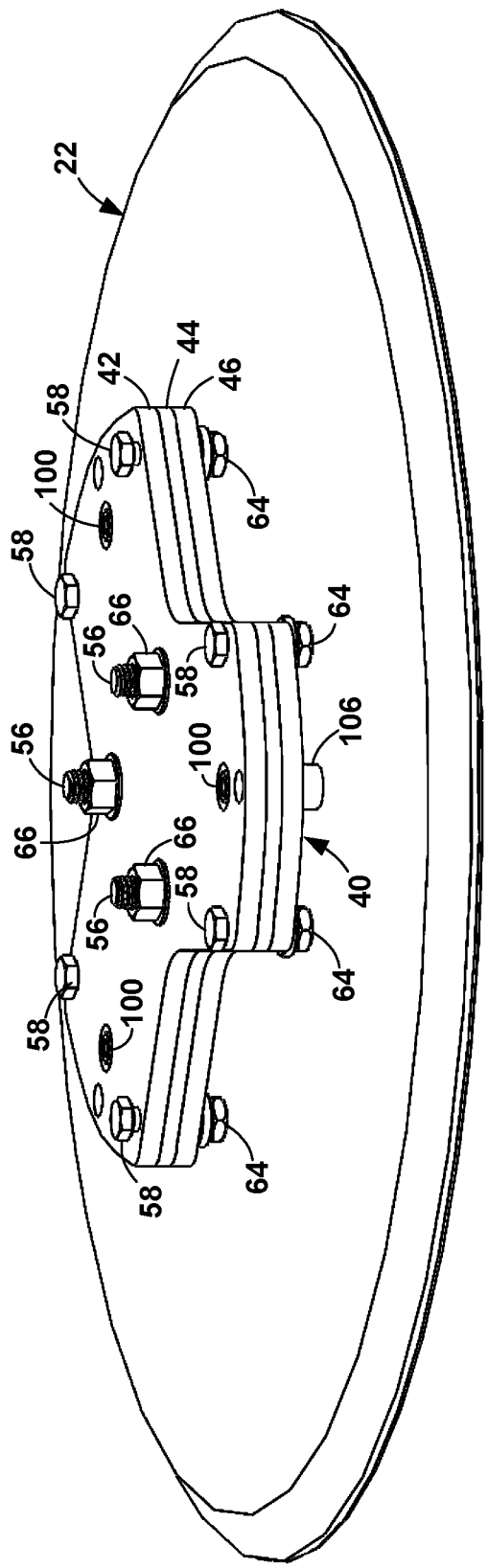
FIG. 4 is an upper perspective view of the coupler with a platen attached.

The plates 42, 44, 46 are secured together by whatever means is appropriate to the application. A non-exhaustive list of appropriate means includes bolts/nuts, rivets, welding, and adhesives. In the illustrated configuration, the plates 42, 44, 46 are secured together by a number of securing bolts/nuts, as shown in FIGS. 2 and 3. There are three center securing bolts 56 and two perimeter securing bolts 58 per void 86. The center securing bolts 56 extend through aligned center securing holes 60 around the center of the hub 50 and are secured by nuts 64. The perimeter securing bolts 58 extend through aligned perimeter securing holes 62 spaced around the perimeter 54 and are secured by nuts 66. If the plates 42, 44, 46 have lobes 52, the perimeter securing holes 62 are located at each of the end corners of each lobe 52.

When mounting the coupler 40 to the tray 70 for the lower platen 20, three tray securing bolts 72 extend through aligned tray mounting holes 74 on the perimeter 54 centered on each void 86 and aligned holes 76 in the tray 70, as in FIG. 3, and are secured by nuts 78. The inner plate 42 abuts the tray 70.

When mounting the coupler 40 to the reciprocating mechanism shaft 30 for the upper platen 22, the three center securing bolts 56 also extend through holes 68 in the shaft 30, as in FIG. 2, so that the inner plate 42 abuts the shaft end 32. When mounting the coupler 40 to shaft 30, the tray mounting holes 74 are not used.

By using bolts and nuts, the coupler 40 is easily removable from the shaft 30 and tray 70 and the plates 42, 44, 46 can be separated for, for example, cleaning and replacement. The present invention also contemplates that the coupler 40 can be permanently mounted to the shaft 30 and/or tray 70 by, for example, welding, rivets, adhesives, etc.

The platen 20, 22 is mounted to the coupler 40 by expansion bolts 100. Each expansion bolt 100 extends through the center plate expansion hole 96 in the center plate 44, through an outer plate expansion hole 104 in the outer plate 46, through a spacer 106, through a hole 114 in the heating pad 36 (when a heating pad 36 is used), and turned into a threaded hole 108 in the platen 20, 22. The hole 114 in the heating pad 36 is large enough to accept the spacer 106 so that the spacer 106 abuts the platen 20, 22 and does not pinch the heating pad 36 against the platen 20, 22.

The head 110 of the expansion bolt 100 resides within an inner plate expansion hole 102 and abuts the center plate 44 at the disc 92 of the expansion compensation lattice 88. The center plate expansion hole 96 is just large enough to easily accept the shaft 116 of the expansion bolt 100 so there is minimal play of the bolt shaft 116 in the center plate expansion hole 96. The remainder of the specification and claims consider the shaft 116 and center plate expansion hole 96 to be the same size. The inner plate expansion hole 102 is somewhat larger than the head 110 of the expansion bolt 100. The outer plate expansion hole 104 is somewhat larger than the center plate expansion hole 96. For manufacturing efficiency, the inner plate expansion hole 102 and outer plate expansion hole 104 are the same size so that the inner plate 42 and outer plate 46 are identical. The significance of the expansion hole sizes is explained below.

Figure 11:
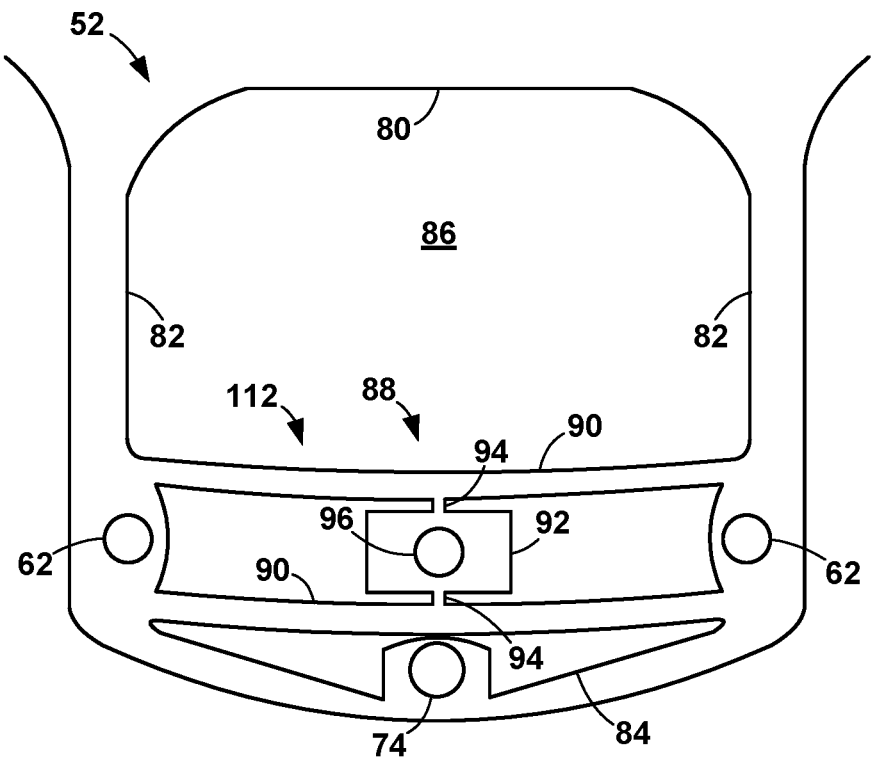
FIG. 11 is a plan view of one lobe showing how the expansion compensation mechanism of FIG. 6 bends to compensate for platen expansion.
Figure 12:
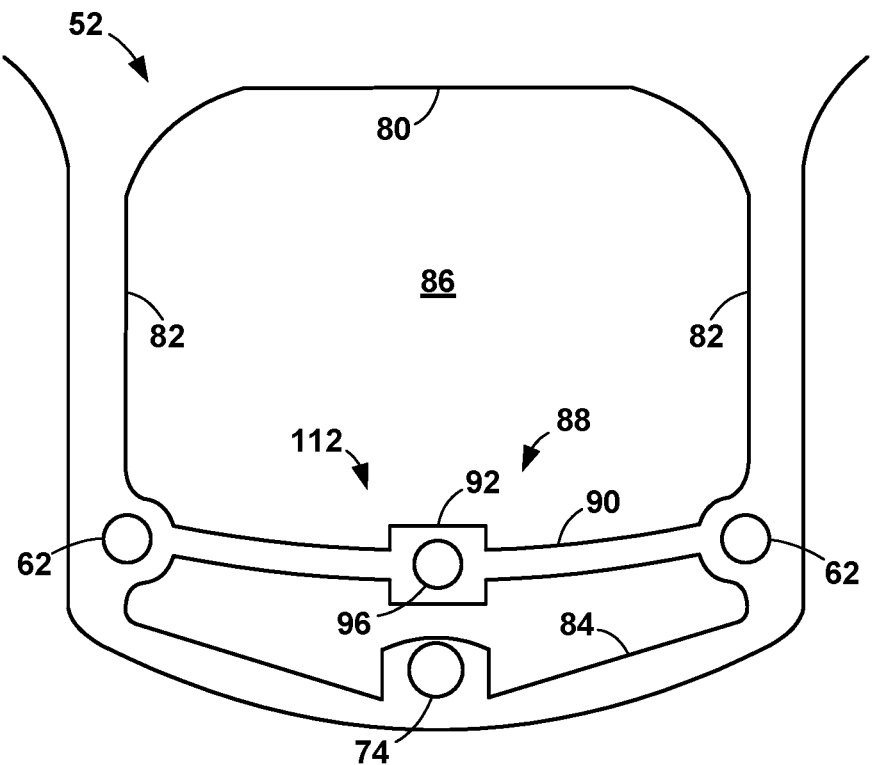
FIG. 12 is a plan view of one lobe showing how the expansion compensation mechanism of FIG. 8 bends to compensate for platen expansion.

When the platen 20, 22 is heated, it expands outwardly from the center relative to the coupler 40. As it expands, it pulls the expansion bolts 100 radially with it. As they move and because the center plate expansion holes 96 are the same size as the expansion bolt shaft 116, the expansion bolts 100 pull outwardly on the center plate expansion holes 96. In the configuration of FIGS. 6 and 7, because the center plate expansion hole 96 is in the disc 92 between the lattice bars 90, the movement of the expansion bolt 100 causes the bars 90 to bend radially outwardly, as at 112 in FIG. 11. In the configuration of FIG. 8, because the expansion hole 96 is in the bar 90, the movement of the expansion bolt 100 causes the bar 90 to bend radially outwardly, as at 112 in FIG. 12. The larger outer plate expansion holes 104 give the expansion bolt shafts 116 space to move outwardly, that is, radially relative to the outer plate 46, without being impeded by the outer plate 46. So, the outer plate expansion holes 104 need to be large enough to allow for the maximum radial movement of the expansion bolt shaft 116.

As described above, the expansion bolt head 110 resides within the inner plate expansion hole 102 and abuts the disc 92. The larger inner plate expansion hole 102 relative to the bolt head 110 gives the expansion bolt head 110 space to move outwardly, that is, radially relative to the inner plate 42, without being impeded by the inner plate 42. So, the inner plate expansion holes 102 need to be large enough to allow for the maximum radial movement of the expansion bolt head 110.

Several different parameters determine the maximum radial movement of the expansion bolt shaft 116 and head 110 including, but not limited to, the materials from which the heated platen 20, 22 and center plate 44 are composed, the maximum temperature of the heated platen 20, 22, and the distance of the expansion bolts 100 from the center of the center plate 44.

The inner plate 42 and outer plate 46 sandwich the center plate 44 securely therebetween so that the lattice 80 can only bend radially and not twist or pivot. If the lattice 80 was allowed to twist, the expansion bolts 100 would tilt causing the heated platen 20, 22 to warp.

In the present design, the center plate 44 is composed of chromoly, a chrome-alloy steel, the inner and outer plates 42, 46 are composed of mild steel, a carbon-iron metal, and the platens 20, 22 are composed of an aluminum alloy.

Thus, it has been shown and described a platen heat expansion compensator for a dough press. Since certain changes may be made in the present disclosure without departing from the scope of the present invention, it is intended that all matter described in the foregoing specification and shown in the accompanying drawings be interpreted as illustrative and not in a limiting sense.

The invention claimed is:

1. An expansion compensating coupler for attaching a platen to a dough press, the coupler comprising:
    (a) a center plate sandwiched between an inner plate and an outer plate, all being secured together;
    (b) the center plate having a plurality of voids spaced equidistantly around the center plate, each void having a distal end and opposed sides;
    (c) a lattice within each void, the lattice including at least one bar extending laterally between the sides of the void and a center plate expansion hole attached to the at least one bar and located at the lateral center of the lattice, the center plate expansion hole adapted to receive a shaft of an expansion bolt having the same size;
    (d) the inner plate having inner plate expansion holes aligned with the center plate expansion holes, the inner plate expansion holes adapted to receive a head of the expansion bolt and to allow motion of the expansion bolt head radially to the inner plate; and
    (e) the outer plate having outer plate expansion holes aligned with the center plate expansion holes, the outer plate expansion holes adapted to allow motion of the shaft of the expansion bolt radially to the outer plate.

2. The expansion compensating coupler of claim 1 wherein the at least one bar is two parallel bars.

3. The expansion compensating coupler of claim 1 wherein the voids are within lobes.

4. The expansion compensating coupler of claim 1 wherein the inner plate, center plate, and outer plate are secured together by bolts and nuts.

5. The expansion compensating coupler of claim 1 wherein the coupler is adapted to be attached to the dough press by bolts and nuts.

6. A dough press comprising:
   (a) a frame having a base and a housing, a lower platen mounted to the base and having a lower working surface, and an upper platen attached to a shaft of a reciprocating mechanism in the housing, the upper platen having an upper working surface opposed to and aligned with the lower working surface, the reciprocating mechanism moving the upper platen up and down relative to the lower platen, at least one of the upper platen and lower platen being a heated platen;
   (b) the heated platen being mounted to the dough press by an expansion compensating coupler comprising:
   (1) a center plate sandwiched between an inner plate and an outer plate, all being secured together;
   (2) the center plate having a plurality of voids spaced equidistantly around the center plate, each void having a distal end and opposed sides;
   (3) a lattice within each void, the lattice including at least one bar extending laterally between the sides of the void and a center plate expansion hole attached to the at least one bar and located at the lateral center of the lattice;
   (4) a shaft of an expansion bolt extending through the center plate expansion hole, an outer plate expansion hole, through a spacer, and turned into a threaded hole in the heated platen, wherein a head of the expansion bolt resides within an inner plate expansion hole and abuts the center plate; and
   (5) the inner plate expansion hole being sized to allow motion of the head radially to the inner plate, the center plate expansion hole being the same size as the shaft, and the outer plate expansion hole sized to allow motion of the shaft radially to the outer plate.

7. The dough press of claim 6 wherein the at least one bar is two parallel bars.

8. The dough press of claim 6 wherein the voids are within lobes.

9. The dough press of claim 6 wherein the inner plate, center plate, and outer plate are secured together by bolts and nuts.

* * * * *